United States Patent

Moroi et al.

(10) Patent No.: US 9,243,621 B2
(45) Date of Patent: Jan. 26, 2016

(54) COMPRESSOR HAVING SUCTION REED VALVE AND VALVE PLATE ARRANGEMENT

(71) Applicant: KABUSHIKI KAISHA TOYOTA JIDOSHOKKI, Aichi-ken (JP)

(72) Inventors: Takahiro Moroi, Kariya (JP);
Masakazu Obayashi, Kariya (JP);
Naofumi Kimura, Kariya (JP);
Fumitaka Yoshizumi, Nisshin (JP);
Yasuhiro Kondoh, Nisshin (JP);
Kazunori Yoshida, Nagoya (JP);
Masakatsu Kuroishi, Seto (JP)

(73) Assignee: KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 298 days.

(21) Appl. No.: 13/626,148

(22) Filed: Sep. 25, 2012

(65) Prior Publication Data
US 2013/0084201 A1 Apr. 4, 2013

(30) Foreign Application Priority Data

Sep. 29, 2011 (JP) .................. 2011-215499

(51) Int. Cl.
*F16K 15/16* (2006.01)
*F04B 39/10* (2006.01)
*F04B 27/10* (2006.01)

(52) U.S. Cl.
CPC ......... *F04B 39/1073* (2013.01); *F04B 27/1036* (2013.01); *F04B 39/108* (2013.01); *F16K 15/16* (2013.01)

(58) Field of Classification Search
CPC ............... F04B 39/1073; F04B 39/108; F04B 39/1036; F04B 39/10; F04B 27/1009; F04B 27/1036; F16K 15/14; F16K 15/16

USPC ............. 417/312; 137/855, 512.15, 527, 858, 137/843, 852, 856
See application file for complete search history.

(56) References Cited

U.S. PATENT DOCUMENTS 1,416,771 A * 5/1922 Babson et al. ............. 137/512.4
2,161,583 A * 6/1939 McClure .................... 294/68.26
(Continued)

FOREIGN PATENT DOCUMENTS

CN 1755108 4/2006
GB 333319 8/1930
(Continued)

OTHER PUBLICATIONS

EPO Search Report, dated Dec. 5, 2013.
(Continued)

*Primary Examiner* — Devon Kramer
*Assistant Examiner* — Nathan Zollinger
(74) *Attorney, Agent, or Firm* — Greenblum & Bernstein, P.L.C.

(57) ABSTRACT

A compressor valve structure permits improvement in durability and volumetric efficiency of a compressor and limits power losses. The width of the base portion of each suction reed valve is shorter than the width of the valve flap. The valve base plate has support portions, receiving portions, main coupling portions, and auxiliary coupling portions. Each support portion receives a central area of corresponding one of the valve flaps. The receiving portion receives a distal area of the valve flap. The main coupling portion extends from the support portion and couples the support portion to the receiving portion. The auxiliary coupling portion extends from the support portion. The suction ports are formed through the valve base plate, while leaving the support portions, the receiving portions, the main coupling portions, and the auxiliary coupling portions.

7 Claims, 15 Drawing Sheets

(56) References Cited

U.S. PATENT DOCUMENTS

| | | | |
|---|---|---|---|
| 3,241,748 A * | 3/1966 | Cramer et al. | 137/512.15 |
| 3,370,786 A * | 2/1968 | Brown | 417/571 |
| 3,751,005 A * | 8/1973 | Earley | 251/368 |
| 3,998,571 A * | 12/1976 | Falke | 417/569 |
| 5,074,768 A * | 12/1991 | Kawamura et al. | 417/571 |
| 5,562,425 A | 10/1996 | Kimura et al. | |
| 5,722,818 A * | 3/1998 | Ohta et al. | 417/312 |
| 7,004,734 B2 * | 2/2006 | Izawa et al. | 417/569 |
| 7,390,176 B2 * | 6/2008 | MacBain et al. | 417/571 |
| 8,869,837 B2 | 10/2014 | Moroi et al. | |
| 2003/0068245 A1 * | 4/2003 | MacBain et al. | 417/569 |
| 2004/0076535 A1 | 4/2004 | Izawa et al. | |
| 2006/0067844 A1 | 3/2006 | Iversen | |
| 2009/0081060 A1 | 3/2009 | Takai | |

FOREIGN PATENT DOCUMENTS

| | | |
|---|---|---|
| JP | 01-159183 | 11/1989 |
| JP | 03-275986 | 12/1991 |
| JP | 8-28449 | 1/1996 |
| JP | 08-61239 | 3/1996 |
| JP | 09-222079 | 8/1997 |
| JP | 11-166480 | 6/1999 |
| JP | 2001-099065 | 4/2001 |
| JP | 2001-193649 | 7/2001 |
| JP | 2006-226113 | 8/2006 |
| JP | 2007-291881 | 11/2007 |
| JP | 2009108687 A * | 5/2009 |
| JP | 2009-235913 | 10/2009 |
| JP | 2009-293546 | 12/2009 |
| JP | 2011-226464 | 11/2011 |
| WO | 2004/106740 | 12/2004 |
| WO | 2008/047515 | 4/2008 |
| WO | 2012/145812 | 11/2012 |

OTHER PUBLICATIONS

U.S. Appl. No. 13/675,390 to Hajime Kurita et al., which was filed on Nov. 13, 2012.
Korea Office action dated Oct. 27, 2013.
Japan Office action dated Aug. 20, 2013.
Japan Office action, mail date is Oct. 16, 2014.
China Office action, mail date is Nov. 2, 2014.

* cited by examiner

Fig. 10
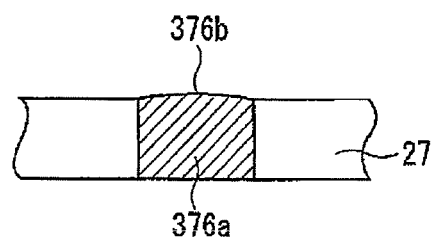
Fig. 11
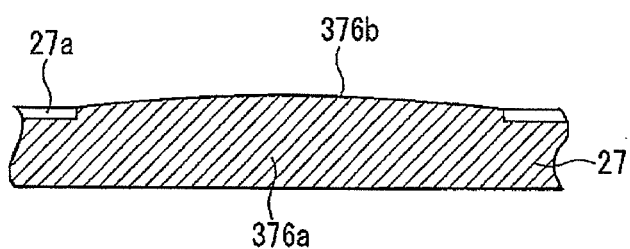
Fig.12(A)    Fig.12(B)
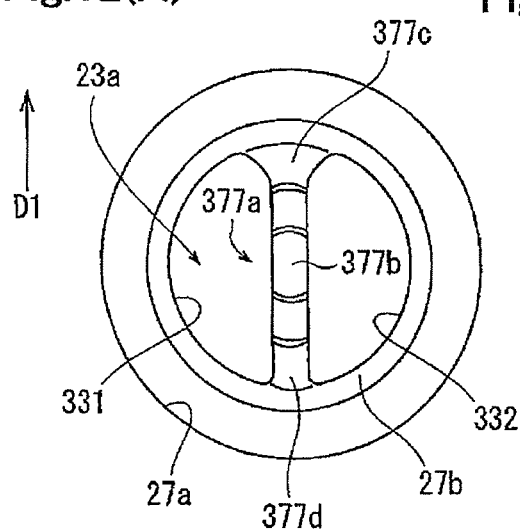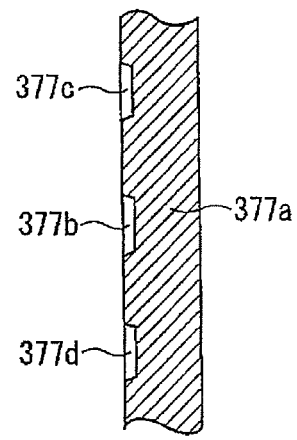

COMPRESSOR HAVING SUCTION REED VALVE AND VALVE PLATE ARRANGEMENT

BACKGROUND OF THE INVENTION

The present invention relates to a compressor, and more particularly to a compressor having a suction reed valve between a suction chamber and a compression chamber.

BACKGROUND ART

For example, Japanese Laid-Open Patent Publication No. 2009-235913, Japanese Laid-Open Patent Publication No. 2006-226113, and Japanese Laid-Open Patent Publication No. 8-28449 have disclosed conventional compressors. In these compressors, a valve base plate is located between a suction chamber and compression chambers. The valve base plate has suction ports for connecting the suction chamber and the compression chambers. Each suction port is opened and closed by an elastically deformable suction reed valve.

The suction reed valve has a fixed portion, a base portion, and a valve flap. The fixed portion is fixed to a fixing surface, which is a surface of the valve base plate facing the compression chambers. The base portion extends from the fixed portion in the longitudinal direction and can be flexed. The valve flap extends from the base portion toward the distal end in the longitudinal direction, and opens and closes the suction port. The valve base plate has extended portions, each of which extends to divide one of the suction ports into two sections. That is, each suction port extends through the valve base plate, while leaving the extended portion formed therein, so that the suction port is divided into two port sections by the extended portion.

In this type of compressor, when the suction reed valve is closed, a central area of the valve flap acts to move toward the valve base plate due to inertial force and pressure difference. However, the extended portion, which is located in the central area of the suction valve flap of the suction reed valve, the valve flap is supported by the extended portion. Therefore, the central area of the valve flap is not significantly flexed into the suction port. The valve flap is thus unlikely to have fatigue failure. Such an advantage is pronounced when the opening area of the suction port is increased to improve the volumetric efficiency of the compressor.

SUMMARY OF THE INVENTION

However, in any of the above described compressors, the width of the base portion of the suction reed valve is equal to the width of the valve flap. Thus, to increase the opening area of the suction port in the compressors, the width of the base portion of the suction reed valve needs to be increased. In this case, the valve flap of the suction reed valve opens the suction port while acting against the great elastic restoring force of the base portion. As a result, the suction resistance increases the power loss. When closing the suction port, the valve flap of the suction reed valve is caused to collide with the valve base plate by the great elastic restoring force of the base portion. This may damage the valve flap and thus decrease the durability.

Accordingly, it is an objective of the present invention to provide a compressor that is unlikely to cause power loss, has a great durability, and is capable of reliably increase the volumetric efficiency;

To achieve the foregoing objective and in accordance with one aspect of the present invention, a compressor that includes a valve base plate and a suction reed valve is provided. The valve base plate is located between a suction chamber and a compression chamber. A suction port for connecting the suction chamber and the compression chamber with each other is formed in the valve base plate. The suction reed valve is elastically deformable and selectively opens and closes the suction port. The suction reed valve is formed by a fixed portion, a base portion, and a valve flap. The fixed portion is fixed to a fixing surface. The fixing surface is a surface of the valve base plate that faces the compression chamber. The base portion extends in a longitudinal direction of the suction reed valve from the fixed portion. The base portion can be flexed. The valve flap extends from the base portion toward a distal end in the longitudinal direction. The valve flap selectively opens and closes the suction port. The width of the base portion is shorter than the width of the valve flap. The valve base plate has a support portion for supporting a central area of the valve flap. The suction port is formed through the valve base plate while leaving the support portion.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 4B is a cross-sectional view illustrating a support portion in the compressor according to the first embodiment;

FIG. 10 is a cross-sectional view taken along a line equivalent to line A-A in FIG. 4, illustrating a support portion of a compressor according to a sixth embodiment;

FIG. 11 is a cross-sectional view taken along a line equivalent to line B-B in FIG. 4, illustrating a support portion of a compressor according to a sixth embodiment;

FIG. 12A is a plan view illustrating a suction port of a compressor according to a seventh embodiment;

FIG. 12B is a cross-sectional view illustrating a support portion in the compressor according to a seventh embodiment;

DETAILED DESCRIPTION OF THE PREFERRED EMBODIMENTS

First to fifteen the embodiments of the present invention will now be described with reference to the drawings.

First Embodiment

Figure 1:
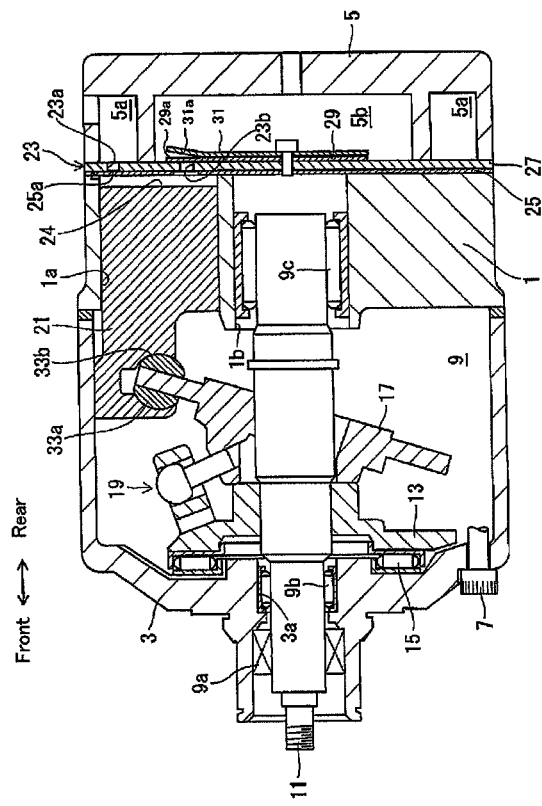
FIG. 1 is a longitudinal cross-sectional view illustrating a compressor according to a first embodiment.

A compressor according to a first embodiment is a swash plate type variable displacement compressor. As shown in FIG. 1, the compressor includes a cylinder block 1 and parallel cylinder bores 1a, which are arranged on concentric circles and at equal angular intervals. The cylinder block 1 is located between a front housing member 3, which is located forward of the cylinder block 1, and a rear housing member 5, which is located rearward of the cylinder block 1. In this state, the cylinder block 1, the front housing member 3, and the rear housing member 5 are fastened together by bolts 7. The cylinder block 1 and the front housing member 3 define a crank chamber 9. A suction chamber 5a and a discharge chamber 5b are formed in the rear housing member 5.

A shaft hole 3a is formed in the front housing member 3, and a shaft hole 1b is formed in the cylinder block 1. The shaft holes 3a, 1b rotationally support a drive shaft 11 via a shaft sealing device 9a and radial bearings 9b, 9c. A pulley or an electromagnetic clutch (nether is shown) is attached to the drive shaft 11. A non-illustrated belt, which is driven by a vehicle engine, is wound about the pulley or the electromagnetic clutch.

In the crank chamber, a lug plate 13 is press-fitted to the drive shaft 11, and a thrust bearing 15 is located between the lug plate 13 and the front housing member 3. The drive shaft 11 extends through a swash plate 17. The lug plate 13 and the swash plate 17 are connected to each other by a link mechanism 19, which supports the swash plate 17 while allowing the inclination of the swash plate 17 to be variable.

A reciprocating piston 21 is accommodated in each cylinder bore 1a. A valve unit 23 is located between the cylinder block 1 and the rear housing member 5. The valve unit 23 of the compressor is formed by a suction valve plate 25, a valve base plate 27, a discharge valve plate 29, and a retainer plate 31. Discharge ports 23b and suction ports 23a are formed through the valve base plate 27. The retainer plate 31 also functions as a gasket. The housing, which includes the cylinder block 1, the front housing member 3, the rear housing member 5, and the valve unit 23, is one example of the present invention.

Figure 2:
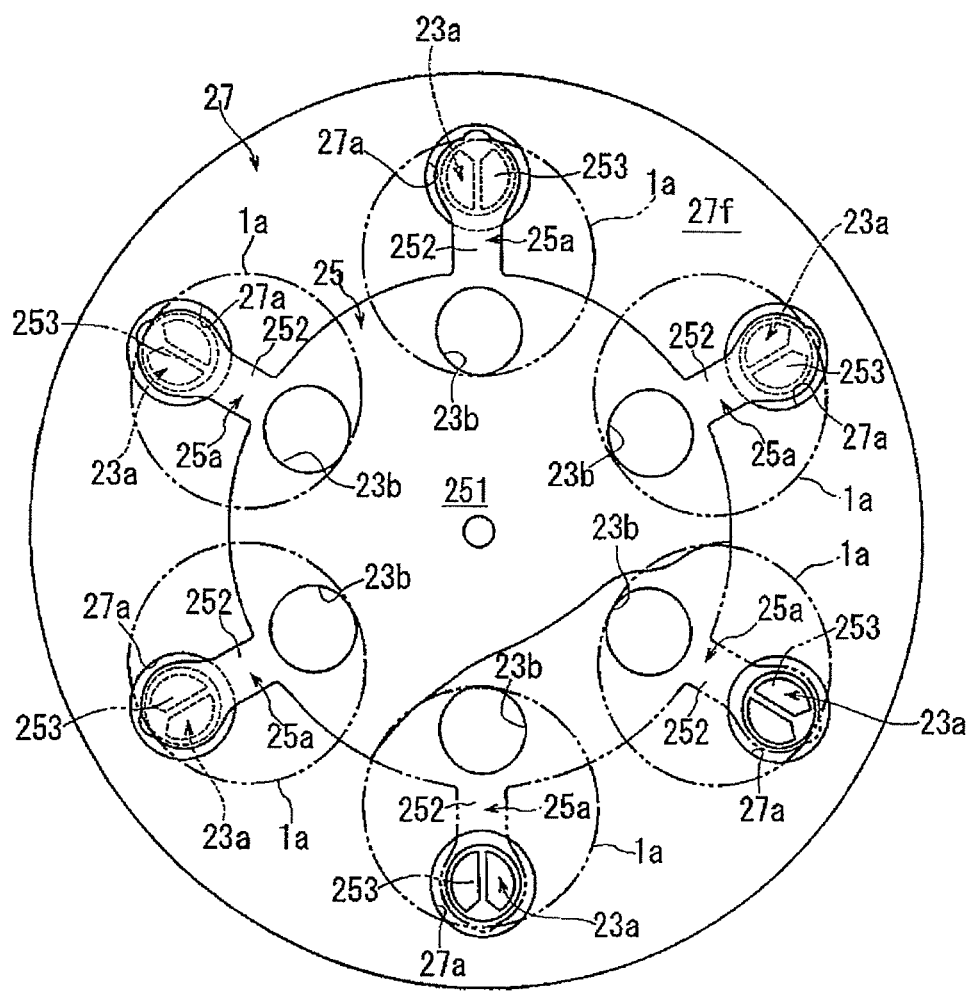
FIG. 2 is a plan view illustrating a valve base plate and a suction valve plate, in which suction reed valves are formed, of the compressor according to the first embodiment.
Figure 3A:
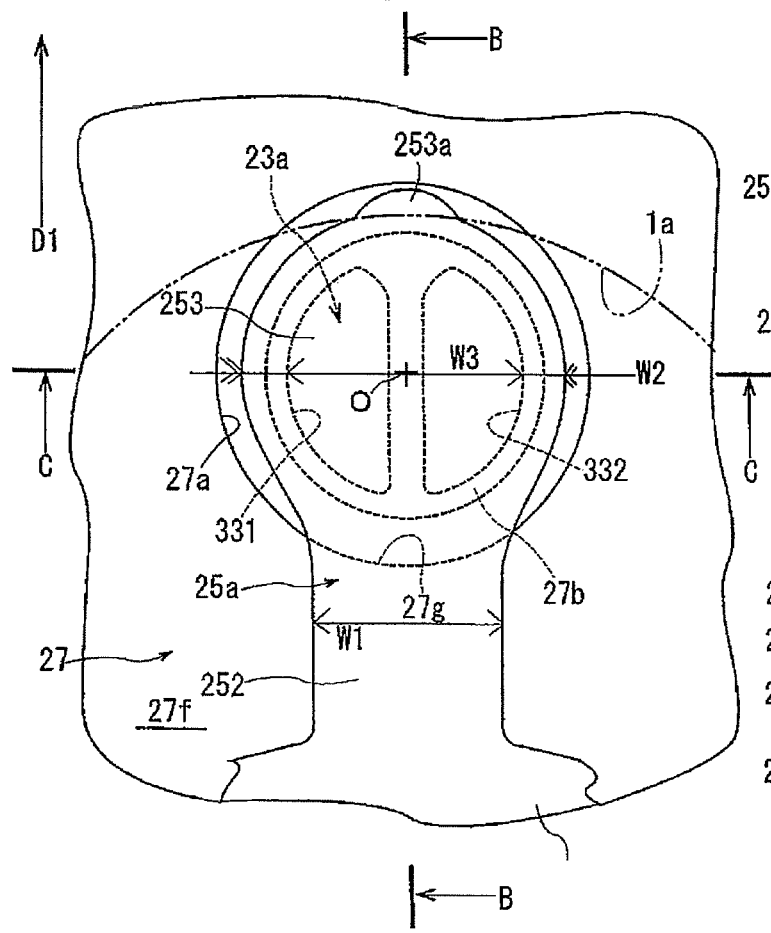
FIG. 3A is an enlarged plan view illustrating a suction reed valve of the compressor according to the first embodiment.
Figure 3B:
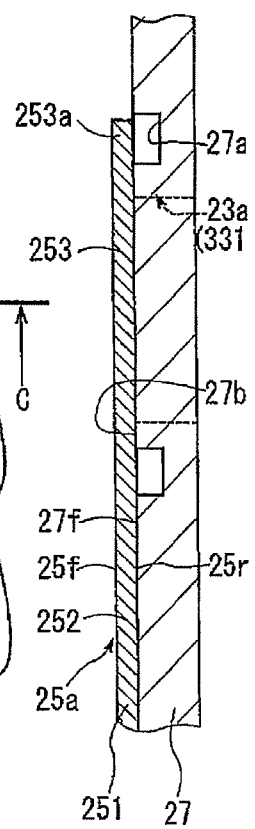
FIG. 3B is a cross-sectional view taken along line B-B in FIG. 3A.
Figure 3C:
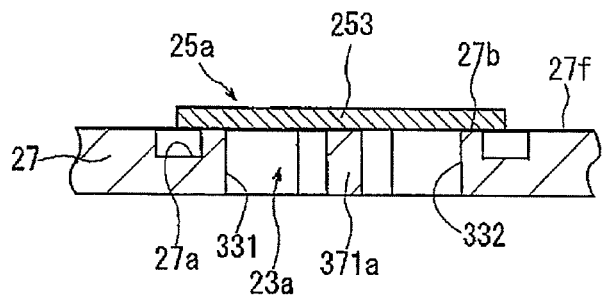
FIG. 3C is a cross-sectional view taken along line C-C in FIG. 3A.

As shown in FIGS. 2 and 3, the suction valve plate 25 of the first embodiment is an elastically deformable thin plate. In a normal state, a front surface 25f and a rear surface 25r of the suction valve plate 25 are parallel with each other. In FIG. 2, the front of the elevation of the drawing corresponds to the front side of the compressor, and the back of the elevation of the drawing corresponds to the rear side of the compressor. The cylinder bore 1a are located forward of the suction valve plate 25 with respect to the elevation of the drawing and indicated by lines formed by a long dash alternating with two short dashes. The valve base plate 27 is located behind the suction valve plate 25 with respect to the elevation of FIG. 2. The suction valve plate 25 has extended portions, which are elongated radially outward. Each extended portion functions as a suction reed valve 25a. The radial direction of the suction valve plate 25 is the longitudinal direction of each suction reed valve 25a (hereinafter, simply referred to as the longitudinal direction). The radially outside of the suction valve plate 25 corresponds to the distal end D1 in the longitudinal direction.

As shown in FIG. 1, pairs of front and rear shoes 33a, 33b are located between the swash plate 17 and each piston 21. The pairs of the shoes 33a, 33b converts swinging motion of the swash plate 17 into reciprocation of each piston 21. Each cylinder bore 1a, the corresponding piston 21, and the valve unit 23 define a compression chamber 24.

Although not illustrated, the crank chamber 9 and the suction chamber 5a are connected to each other by a bleed passage, and the crank chamber 9 and the discharge chamber 5b are connected to each other by a supply passage. A displacement control valve is located in the supply passage. The displacement control valve changes the opening degree of the supply passage in accordance with the suction pressure. A condenser is connected to the discharge chamber 5b of the compressor, and the condenser is connected to an evaporator via an expansion valve. The evaporator is connected to the suction chamber 5a of the compressor. The compressor, the condenser, the expansion valve, and the evaporator form an air conditioner, which is mounted in a vehicle and performs air conditioning of the passenger compartment.

Discharge ports 23b are formed in the valve base plate 27 to connect each compression chamber 24 with the discharge chamber 5b. The discharge valve plate 29 has discharge reed valves 29a for opening and closing the discharge ports 23b. Retainers 31a, which restrict the flexed amount of the discharge reed valves 29a, are formed in the retainer plate 31.

Suction ports 23a are formed in the valve base plate 27 to connect the suction chamber 5a with each compression chamber 24. Each suction port 23a is offset toward the distal end D1 with respect to the center of the corresponding cylinder bore 1a as shown in FIG. 2.

As shown in FIGS. 3 and 4, each suction port 23a is divided into two port sections 331, 332 by a support portion 371a, a receiving portion 371b, a main coupling portion 371c, and an auxiliary coupling portion 371d.

A surface of the valve base plate 27 that faces the compression chambers 24 is a fixing surface 27f. Annular recessed grooves 27a, each of which surrounds one of the suction ports 23a in the circumferential direction, are formed in the fixing surface 27f. On the fixing surface 27f, the annular area between each suction port 23a and the corresponding recessed groove 27a is a sealing surface 27b. The sealing surface 27b is flush with a part of the fixing surface 27f that is outside of the recessed groove 27a. The sealing surface 27b is the peripheral edge of the suction port 23a. When the suction port 23a is closed, the sealing surface 27b contacts a valve flap 253 to prevent refrigerant from leaking from the compression chamber 24 to the suction chamber 5a via the suction port 23a.

As shown in FIGS. 2 and 3, a fixed portion 251, which is fixed to the fixing surface 27f of the valve base plate 27, has six suction reed valves 25a. Each suction reed valve 25a is formed by a base portion 252, which extends in the longitudinal direction from the fixed portion 251 toward the distal end D1, and a valve flap 253, which extends in the longitudinal direction from the base portion 252 toward the distal end D1. The base portion 252 can be flexed. An arcuate stopper 253a projects from the distal end D1 of each valve flap 253. The stopper 253a lies off the corresponding cylinder bore 1a by one to several millimeters. In the present embodiment, the longitudinal direction is parallel with the fixing surface 27f and also parallel with the radial direction of the drive shaft 11. The distal end D1 of the longitudinal direction corresponds to the outside in the radial direction of the drive shaft 11.

As shown in FIG. 3(A), in a plan view of the base portion 252 and the valve flap 253, the base portion 252 is shaped like a rectangle with its long sides extending toward the distal end D1. The valve flap 253 except for the stoppers 253a is circular, and the diameter is longer than the short sides of the base portion 252. That is, the width W1 of the base portion 252 is shorter than the width W2 of the valve flap 253. The width W1 of the base portion 252 is shorter than the length W3 of the suction port 23a in the width direction.

Figure 4A:
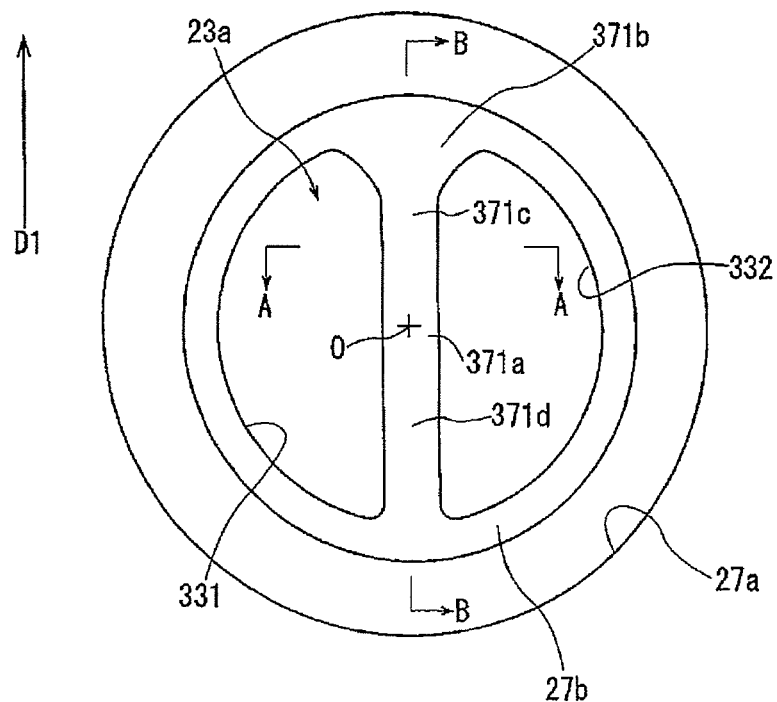
FIG. 4A is a plan view illustrating a suction port of the compressor according to the first embodiment.
Figure 4B:
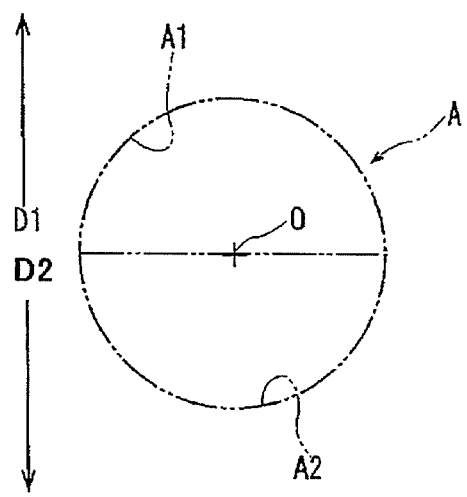
FIG. 4B is a plan view illustrating a suction area in the compressor according to the first embodiment.

As shown in FIGS. 3 and 4, the valve base plate 27 has support portions 371a, receiving portions 371b, main coupling portions 371c, and auxiliary coupling portions 371d. Each support portion 371a receives a central area of corresponding one of the valve flaps 253. The receiving portion 371b receives a distal area of the valve flap 253. The main coupling portion 371c couples the support portion 371a to the receiving portion 371b. The auxiliary coupling portion 371d extends from the support portion 371a. The central area of the valve flap 253 refers to a certain range of the valve flap 253 that is inside the sealing surface 27b and includes the center O of the valve flap 253. The distal area of the valve flap 253 refers to a certain range located closer to the distal end D1 than the central area. As shown in FIG. 4(B), suction areas A are defined on the valve base plate 27. A suction port 23a is formed inside each suction area A. Each suction area A is formed by a semicircular suction area A1, which is located closer to the distal end D1 in the longitudinal direction, and a semicircular proximal suction area A2, which is located closer to a proximal end D2 in the longitudinal direction. As shown in FIG. 4(A), the support portion 371a is a predetermined area that contains the center O of the suction area A. The support portion 371a is positioned to receive the central area of the valve flap 253. As viewed from the support portion 371a, the suction port 23a is located on the left and right sides of the distal end D1 and the proximal end D2 in the longitudinal direction. The main coupling portion 371c extends from the support portion 371a to divide the distal suction area A1 into two sections by the support portion 371a. The auxiliary coupling portion 371d divides the proximal suction area A2 into two sections by the support portion 371a. The suction ports 23a are formed through the valve base plate 27, while leaving the support portions 371a, the receiving portions 371b, the main coupling portions 371c, and the auxiliary coupling portions 371d.

Figure 4C:
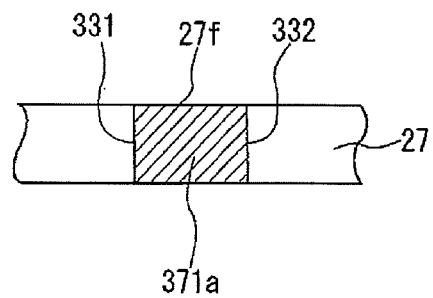

The auxiliary coupling portion 371d, the support portion 371a, the main coupling portion 371c, and the receiving portion 371b form an I-shape extending toward the distal end D1 in the longitudinal direction. As shown in FIG. 4(C), the support portion 371a, the receiving portion 371b, the main coupling portion 371c, and the auxiliary coupling portion 371d are flush with the fixing surface 27f. The support portion 371a, the receiving portion 371b, the main coupling portion 371c, and the auxiliary coupling portion 371d exist between the port sections 331, 332. The port sections 331, 332, which have the above described shapes, are formed, for example, by punching the valve base plate 27.

As shown in FIG. 4(A), the support portion 371a, the main coupling portion 371c, and the auxiliary coupling portion 371d have the same dimensions in the width direction, which is perpendicular to the longitudinal direction. The dimension of the receiving portion 371b in the width direction is larger than those of the support portion 371a, the main coupling portion 371c, and the auxiliary coupling portion 371d. The edges of the port sections 331, 332 do not form sharp corners, but are slightly rounded due to the restriction of machining accuracy, for example, of the punching press.

Figure 5:
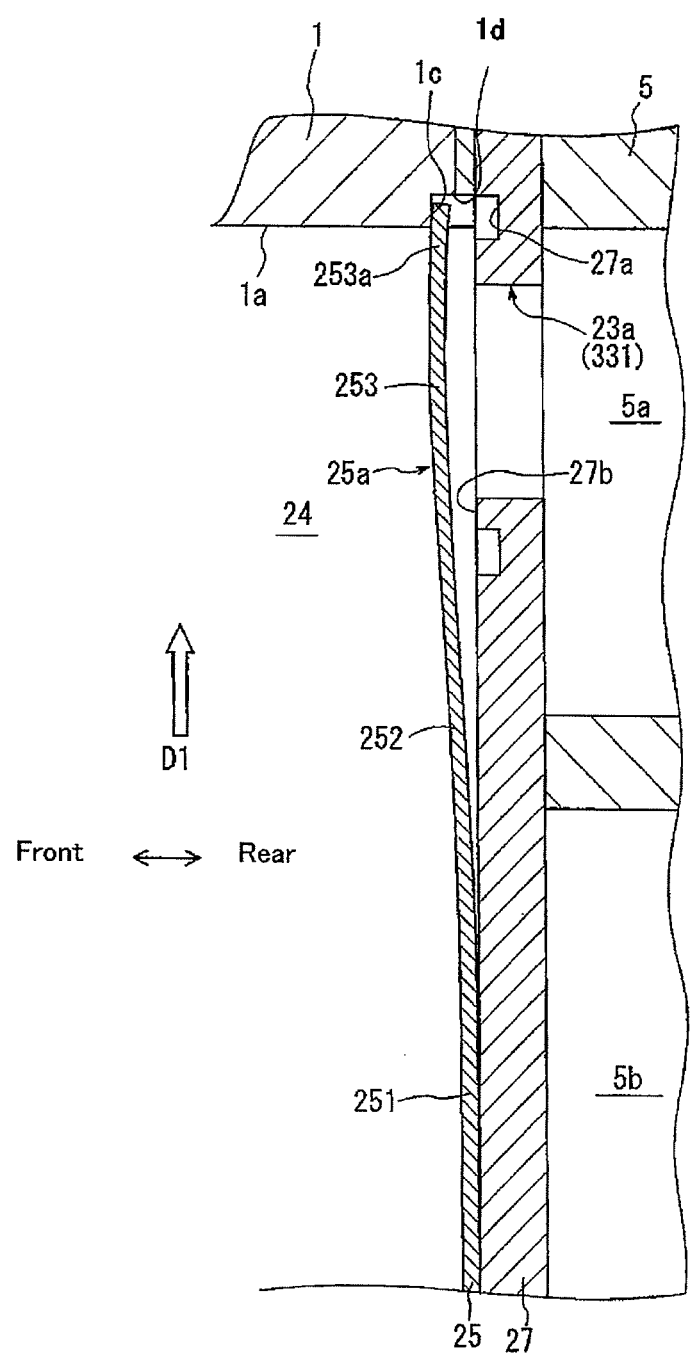
FIG. 5 is an enlarged cross-sectional view illustrating a state of the compressor according to the first embodiment, in which a suction reed valve opens a suction port.

As shown in FIG. 5, the cylinder block 1 has recessed retainers 1d, against which the stoppers 253a abut. Each stopper 253a is prevented from moving further by the corresponding retainer 1d. The retainers 1d are formed on the rear end face of the cylinder block 1, and a contact surface 1c is formed at the front end of each retainer 1d. When each valve flap 253 opens the corresponding suction port 23a, the stopper 253a moves in the corresponding retainer 1d and is stopped when contacting the contact surface 1c. That is, the stroke of the stopper 253a is equal to the depth of the retainer 1d.

According to the compressor configured as described above, when the drive shaft 11 is rotated, the lug plate 13 and the swash plate 17 are rotated in synchronization with the drive shaft 11, and each piston 21 reciprocates in the corresponding cylinder bore 1a by a stroke corresponding to the inclination angle of the swash plate 17. Thus, the refrigerant in the suction chamber 5a is drawn into each compression chamber 24 and compressed, and discharged to the discharge chamber 5b. The refrigerant that is compressed by the compressor contains misted lubricant oil. The lubricant oil is provided to sliding parts such as the piston 21, the shoes 33a, 33b, and the swash plate 17, thereby preventing wear of these parts. The lubricant oil is also stored in the recessed groove 27a.

As shown in FIG. 5, each reed valve 25a is elastically deformed at the base portion 252 due to the difference between the pressure in the suction chamber 5a and the pressure in the compression chamber 24. Accordingly, the valve flap 253 is moved to open the suction port 23a. The valve flap 253 does not start opening the suction port 23a until the pressure difference overcomes the elastic restoring force and adherence of the base portion 252.

In the compressor, at the moment the suction reed valve 25a closes, the central area of the valve flap 253 acts to significantly flex into the suction port 23a due to the inertial force and the pressure difference. However, the central area of the valve flap 253 is supported by the support portion 371a. When returning to the position for closing the suction port 23a, the valve flap 253 collides with the fixing surface 27f while flexing like a whip toward the distal end D1 in the longitudinal direction. In the present embodiment, since the auxiliary coupling portion 371d, the support portion 371a, the main coupling portion 371c, and the receiving portion 371b form an I-shape extending toward the distal end D1 in the longitudinal direction, the strength of the support portion 371a is increased. Also, when colliding with the fixing surface 27f as described above, the valve flap 253 is reliably supported by the support portion 371a from a part away from the distal end D1 toward the distal end D1. This is unlikely to cause fatigue failure in the valve flap 253.

Particularly, in the compressor, when the valve flap 253 of each suction reed valve 25a collides with the corresponding receiving portion 371b, the lubricant oil on the receiving portion 371b reduces the colliding force due to the squeeze effect. A great stress is therefore unlikely to be generated in the distal end of the valve flap 253. The squeeze effect refers to a phenomenon in which, when a clearance between parallel surfaces decreases at a speed V, fluid therebetween, due to its viscosity, resists against being squeezed out of the clearance and generates pressure (the pressure being proportional to the coefficient of viscosity and the speed V). This prevents fatigue failure of the suction reed valve 25a, so that the durability of the compressor is improved.

Therefore, in the compressor, the opening area of the suction port 23a can be increased so that a great amount of refrigerant is taken in the compression chamber 24, so that the volumetric efficiency is increased. Further, the width W1 of the base portion 252 of each suction reed valve 25a is shorter than the width W2 of the valve flap 253. The width W1 of the base portion 252 is shorter than the length W3 of the suction port 23a in the width direction. Therefore, the elastic restoring force of the base portion 252 is reliably reduced while increasing the opening area of each suction port 23a. Thus, the suction resistance when the valve flap 253 opens the suction port 23a is reduced, and power loss is unlikely. Also, the colliding force when the valve flap 253 closes the suction port 23a is reduced, which prevents the valve flap 253 from being damaged.

Therefore, the compressor is relatively durable, is capable of reliably increasing the volumetric efficiency, and power losses in the compressor are limited.

Also, the compressor prevents a delay in opening the suction reed valve 25a. This reduces the suction pulsation and therefore reduces the operational noise of the compressor.

Further, the grooves 27a are formed in the fixing surface 27f of the valve base plate 27. Therefore, when each suction reed valve 25a closes the corresponding suction port 23a, the base portion 252 and an arcuate portion 27g of the recessed groove 27a (see FIG. 3(A)) that faces the proximal end D2 overlap with each other in a wide range. Thus, the area in which the fixing surface 27f and the base portion 252 closely contact each other is reduced by the amount corresponding to the area of overlapping range. This reduces the delay in the opening of the suction reed valve 25a.

Second Embodiment

Figure 6:
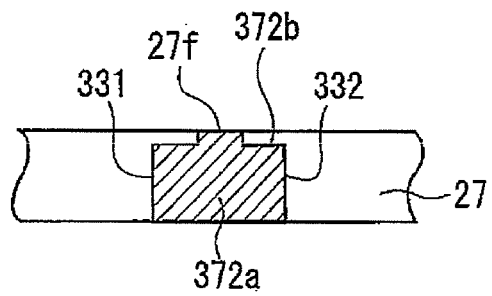
FIG. 6 is a cross-sectional view taken along a line equivalent to line A-A in FIG. 4, illustrating a support portion of a compressor according to a second embodiment.

The valve flap 253 does not necessarily need to contact the entire surface of the support portion, the receiving portion, the main coupling portion, and the auxiliary coupling portion. For example, in a compressor according to a second embodiment, a recess 372b is formed on the surface of a support portion 372a as shown in FIG. 6. The recess 372b includes grooves on both sides of the support portion 372a in the width direction. The other configurations are the same as those of the compressor according to the first embodiment.

In the compressor of the second embodiment, the contact area between the valve flap 253 of the suction reed valve 25a and the support portion 372a is reduced. The adherence is decreased, accordingly, and the suction reed valve 25a is easier to open. Also, according to this configuration, the contact area, or the adherence, between the valve flap 253 and the support portion 372a can be reduced while maintaining the width of the support portion 372a to maintain the strength thereof. The other advantages are the same as those of the first embodiment.

Third Embodiment

Figure 7:
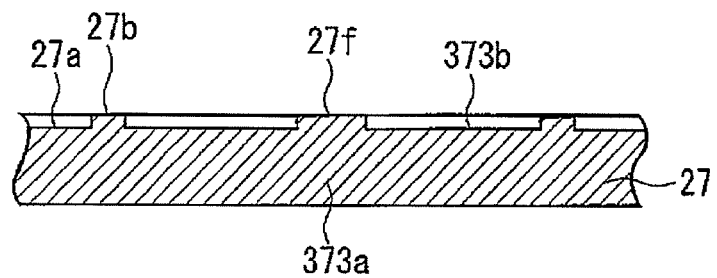
FIG. 7 is a cross-sectional view taken along a line equivalent to line B-B in FIG. 4, illustrating a support portion of a compressor according to a third embodiment.

In a compressor according to a third embodiment, a recess 373b is formed on the surface of a support portion 373a as shown in FIG. 7. The recess 372b is shaped like a groove extending in the longitudinal direction of the support portion 373a. The other configurations are the same as those of the compressor according to the first embodiment.

In the compressor of the third embodiment, the contact area is reduced. Also, due to the reverse squeeze effect at valve opening, the adherence is reduced, which makes valve opening easier. The other advantages are the same as those of the first embodiment.

Fourth Embodiment

Figure 8:
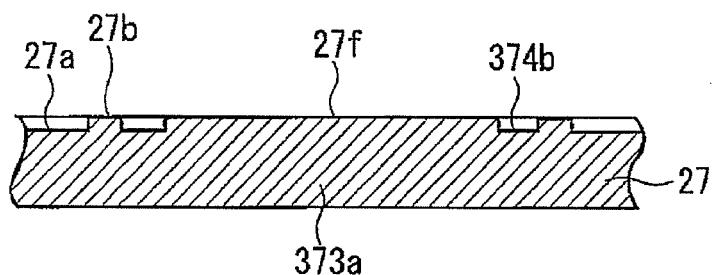
FIG. 8 is a cross-sectional view taken along a line equivalent to line B-B in FIG. 4, illustrating a support portion of a compressor according to a fourth embodiment.

In a compressor according to a fourth embodiment, narrow groove-lie recesses 374b are formed on both ends of the support portion 374a in the longitudinal direction as shown in FIG. 8. The other configurations are the same as those of the compressor according to the first embodiment.

In the compressor according to the fourth embodiment, the grooves 374b blocks movement of lubricant oil between the sealing surface 27b and the support portion 374a, so that supply of lubricant oil from the sealing surface 27b to the support portion 374a is stopped. This reduces the adherence between the support portion 374a and the valve flap 253, so that valve opening is facilitated. The other advantages are the same as those of the first embodiment.

Fifth Embodiment

Figure 9:
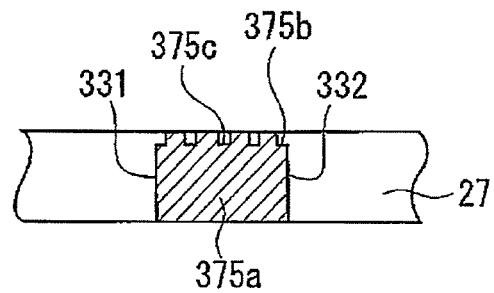
FIG. 9 is a cross-sectional view taken along a line equivalent to line A-A in FIG. 4, illustrating a support portion of a compressor according to a fifth embodiment.

In a compressor according to a fifth embodiment, recesses 375b at both sides and three narrow groove-like recesses 375c between the side recesses 375b are formed in the support portion 375a as shown in FIG. 9. The other configurations are the same as those of the compressor according to the second embodiment.

In the compressor according to the fifth embodiment, the contact area between the support portion 375a and the valve flap 253 is reduced. The adherence is decreased, accordingly, and valve opening is facilitated. The other advantages are the same as those of the first embodiment.

Sixth Embodiment

In a compressor according to a sixth embodiment, a crowning 376b is formed on the support portion 376a as shown in FIGS. 10 and 11. The other configurations are the same as those of the compressor according to the first embodiment.

In the compressor of the second embodiment, the contact area between the valve flap 252 of the suction reed valve 25a and the support portion 376a is reduced. The adherence is decreased, accordingly, and the suction reed valve 25a is easier to open. The other advantages are the same as those of the first embodiment.

Seventh Embodiment

In a compressor according to a seventh embodiment, a support portion 377a is subjected to coining and grinding thereafter to form recesses 377b, 377c, 377d as shown in FIG. 12. The other configurations are the same as those of the compressor according to the first embodiment. The compressor according to the seventh embodiment has the same advantages as the compressor according to the third embodiment.

Eighth Embodiment

Figure 13:
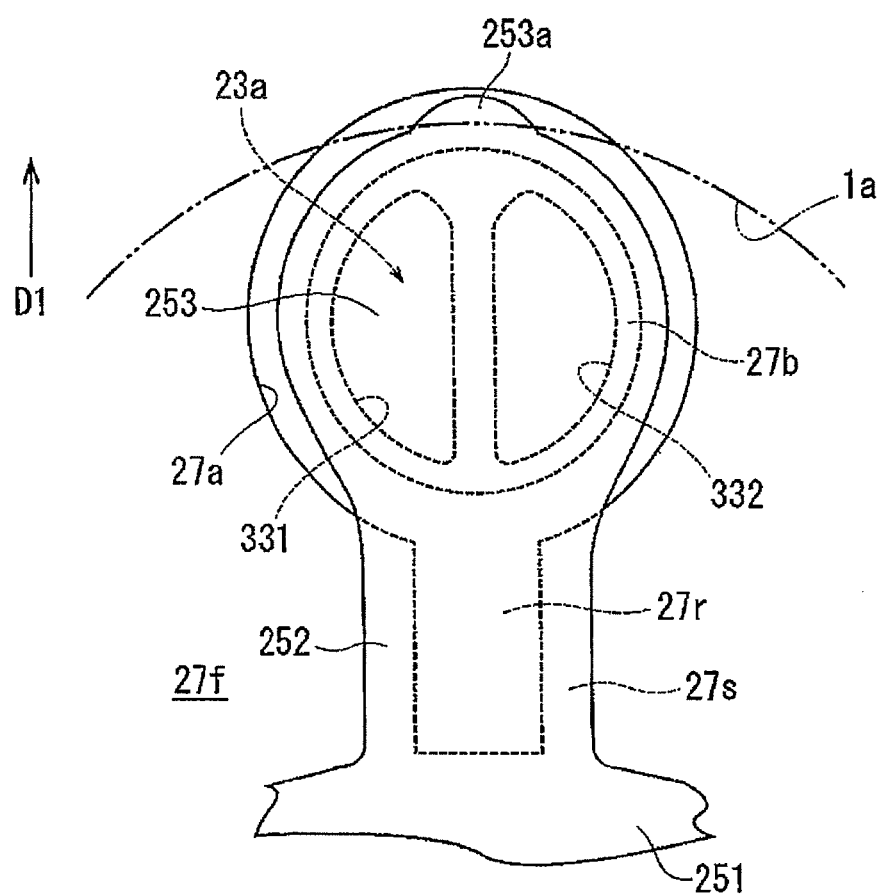
FIG. 13 is a plan view illustrating a suction reed valve of a compressor according to an eighth embodiment.

In a compressor according to an eighth embodiment, a communication groove 27r is formed in the fixing surface 27f as shown in FIG. 13. The communication groove 27r extends toward the distal end D1 in the longitudinal direction and communicates with the recessed grooves 27a. The part of the fixing surface 27f except for the communication groove 27r functions as a contact portion 27s, which contacts the suction reed valve 25a. The contact portion 27s is located on either side of the communication groove 27r in the width direction of the fixing surface 27f. In a plan view of the suction reed valve 25a closing the suction port 23a, the contact portion 27s overlaps with the base portion 252. In the present embodiment, the width of the communication groove 27r is 50% to 75% of the width of the base portion 252, so that the contact portion 27s reliably supports the base portion 252. The other advantages are the same as those of the first embodiment.

In the compressor according to the eighth embodiment, the area in which the fixing surface 27f closely contacts the base portion 252 is reduced by the area of the communication groove 27r, so that the valve flap 253 is easily opened by the pressure difference. The other advantages are the same as those of the first embodiment.

Ninth Embodiment

Figure 14:
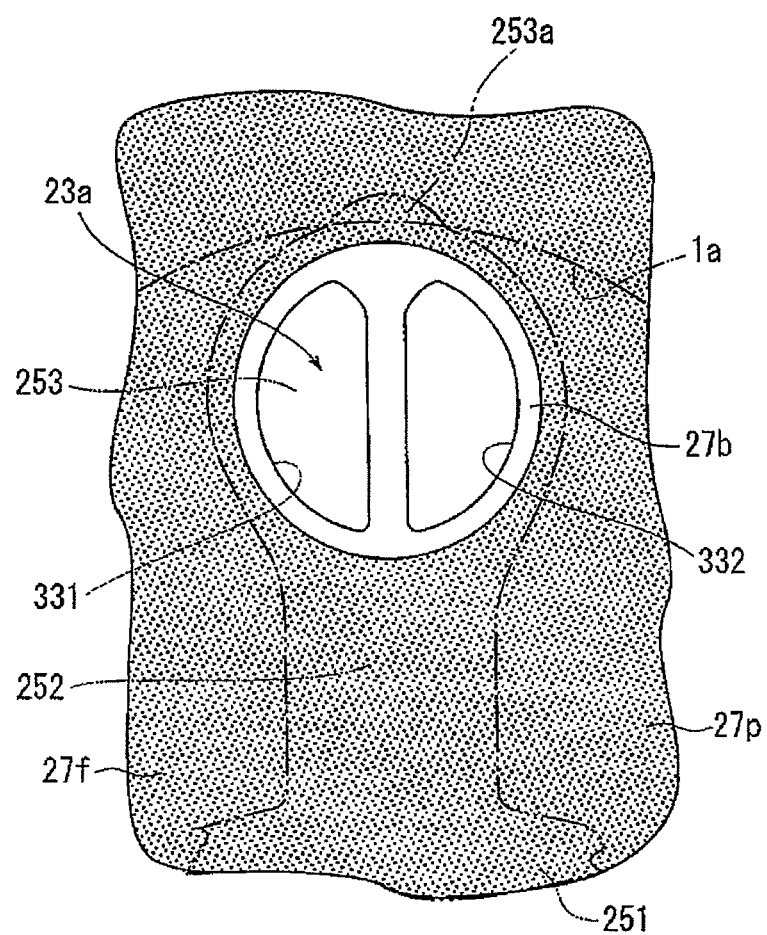
FIG. 14 is a plan view illustrating a suction reed valve of a compressor according to a ninth embodiment.

In a compressor according to a ninth embodiment, a rough surface 27p is formed on the fixing surface 27f as shown in FIG. 14. The rough surface 27p is not formed around the suction port 23a. Instead, the periphery of the suction port 23a is formed as a sealing surface 27b, which is flush with the fixing surface 27f. The other advantages are the same as those of the first embodiment.

In the compressor according to the ninth embodiment, the rough surface 27p is formed to allow the entire peripheral portion of the valve flaps 253 to be separated from the bottom of the rough surface 27p. This allows the valve flap 253 to be easily opened by the pressure difference. The other advantages are the same as those of the first embodiment.

Tenth Embodiment

Figure 15:
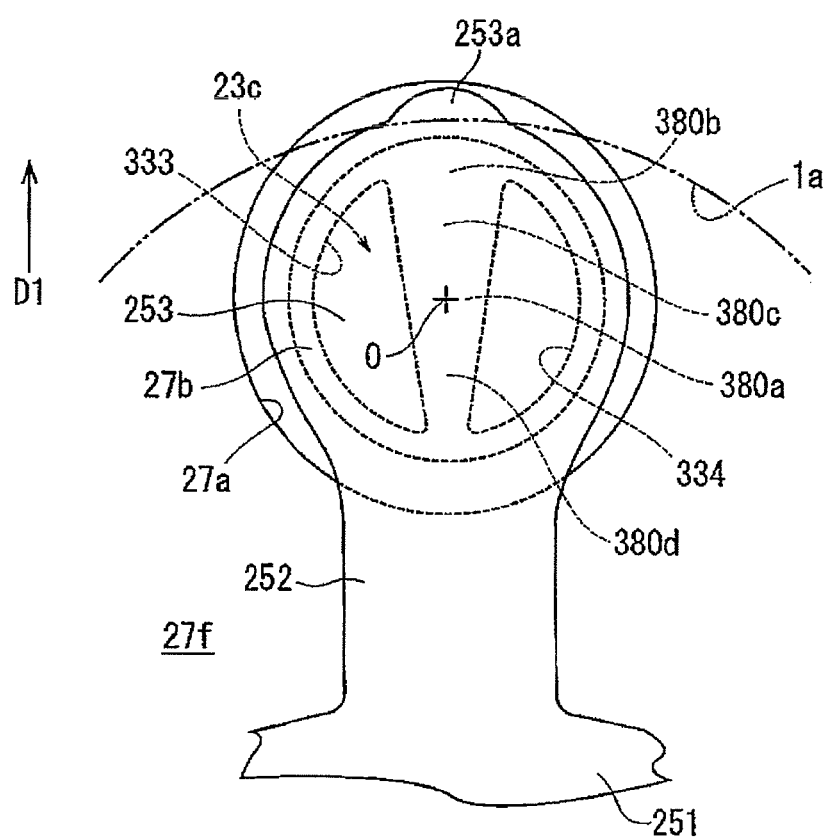
FIG. 15 is a plan view illustrating a suction reed valve of a compressor according to a tenth embodiment.

In a compressor according to a tenth embodiment, the width of each of an auxiliary coupling portion 380d, a support portion 380a, a main coupling portion 380c, and a receiving portion 380b is increased toward the distal end D1 in the longitudinal direction D1 as shown in FIG. 15. The suction port 23c is divided into two port sections 333, 334 by the auxiliary coupling portion 380d, the support portion 380a, the main coupling portion 380c, and the receiving portion 380b. The other configurations are the same as those of the compressor according to the first embodiment.

The compressor according to the seventh embodiment has the same advantages as the compressor according to the first embodiment.

Eleventh Embodiment

Figure 16:
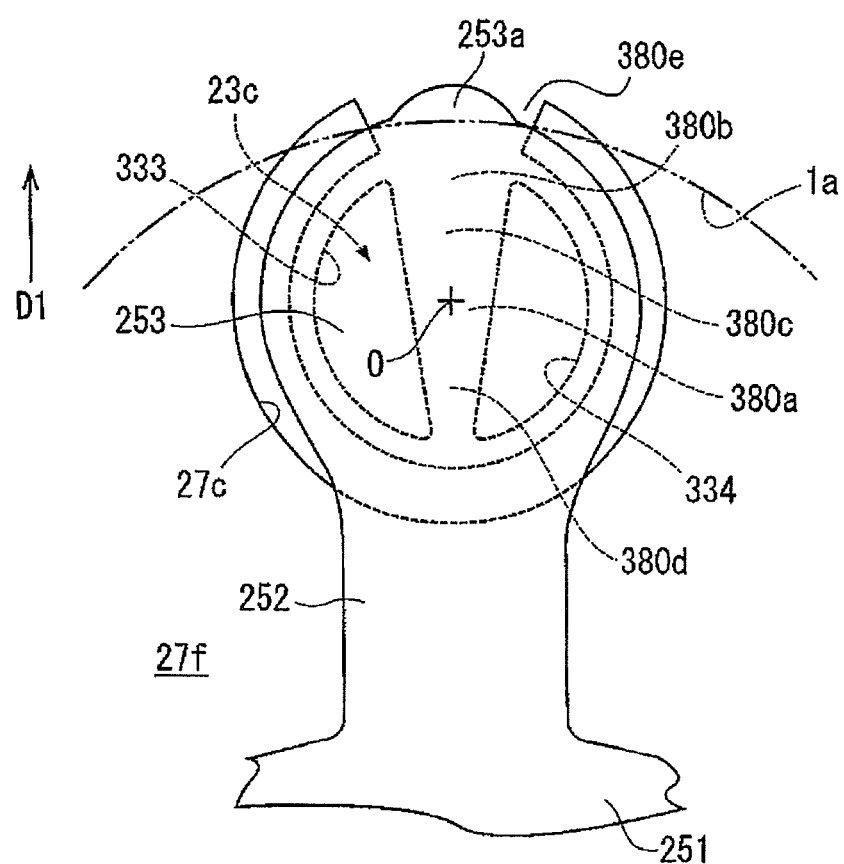
FIG. 16 is a plan view illustrating a suction reed valve of a compressor according to an eleventh embodiment.

In a compressor according to an eleventh embodiment, a C-shaped groove 27c is employed as shown in FIG. 16. The groove 27c is formed in the fixing surface 27f and has an arcuate shape along a circle having the same center as the center O. The groove 27c surrounds the suction port 23a except for a part close to the distal end D1 in the longitudinal direction. The fixing surface 27f has receiving portions 380b and 380e. The receiving portions 380b, 380e are located between ends of the groove 27c, which face each other at a part close to the distal end D1 in the longitudinal direction. The other configuration is the same as that of the tenth embodiment.

In this case, the distance between the facing ends of the groove 27c at the distal end D1 in the longitudinal direction is increased, so that the receiving portions 380b, 380e with great widths can be easily formed between the facing ends of the groove 27c. Thus, when the valve flaps 253 collides with the receiving portions 380b and 380e, the lubricant oil on the large receiving portions 380b and 380e reliably reduces the colliding force. Therefore, a great stress is easily generated at the distal end of the valve flap 253. As a result, the compressor effectively prevents the suction reed valve 25a from being damaged, which improves durability. The other advantages are the same as those of the tenth embodiment.

Twelfth Embodiment

Figure 17:
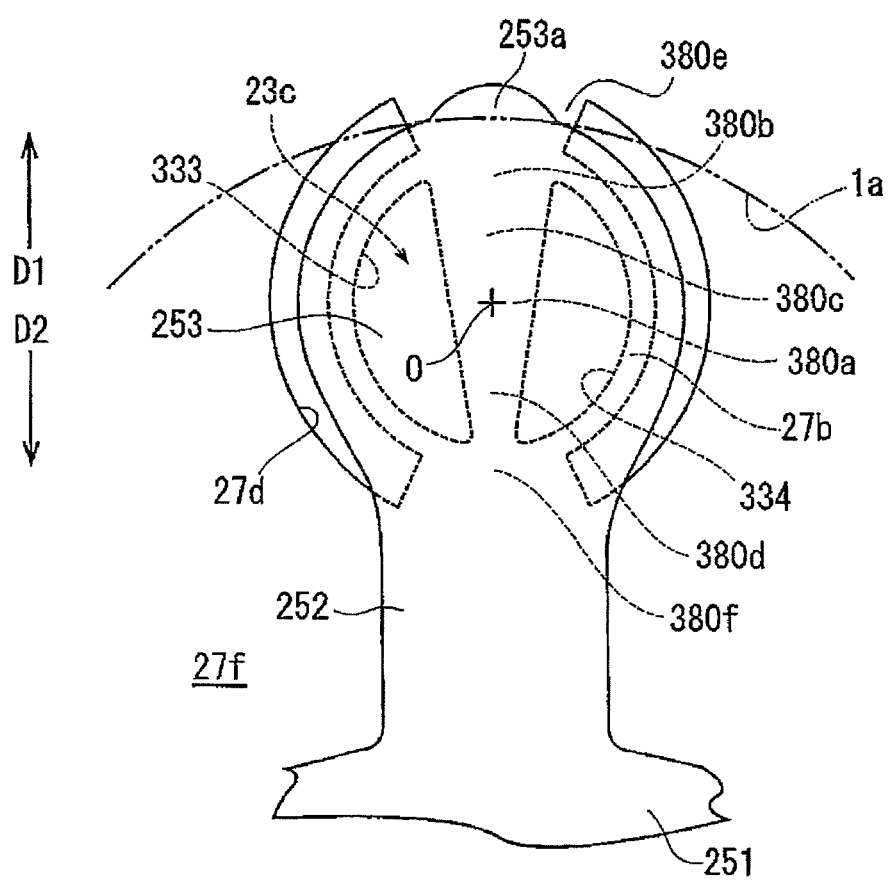
FIG. 17 is a plan view illustrating a suction reed valve of a compressor according to a twelfth embodiment.

In a compressor according to a twelfth embodiment, a groove 27d having two arcuate portions is employed as shown in FIG. 17. The groove 27d is formed in the fixing surface 27f and has parenthesis-shaped sections along a circle having the same center as the center O. The groove 27d surrounds the suction port 23a except for a part close to the distal end D1 and a part close to the proximal end D2 in the longitudinal direction. The fixing surface 27f has a contact portion 380f. The contact portion 380f is located between the parts of the groove 27c that are close to the proximal end D2 in the longitudinal direction. In the present embodiment, the groove 27d functions to separate the side peripheral edges of the valve flap 253 from the bottom. The other configuration is the same as that of the eleventh embodiment.

In this case, when the base portion 252 of the suction reed valve 25a collides with the contact portion 380f, only a small stress is generated in the base portion 252 by the large contact portion 380f. As a result, the compressor effectively prevents the suction reed valve 25a from being damaged and has an improved durability. The other advantages are the same as those of the first embodiment.

Thirteenth Embodiment

Figure 18:
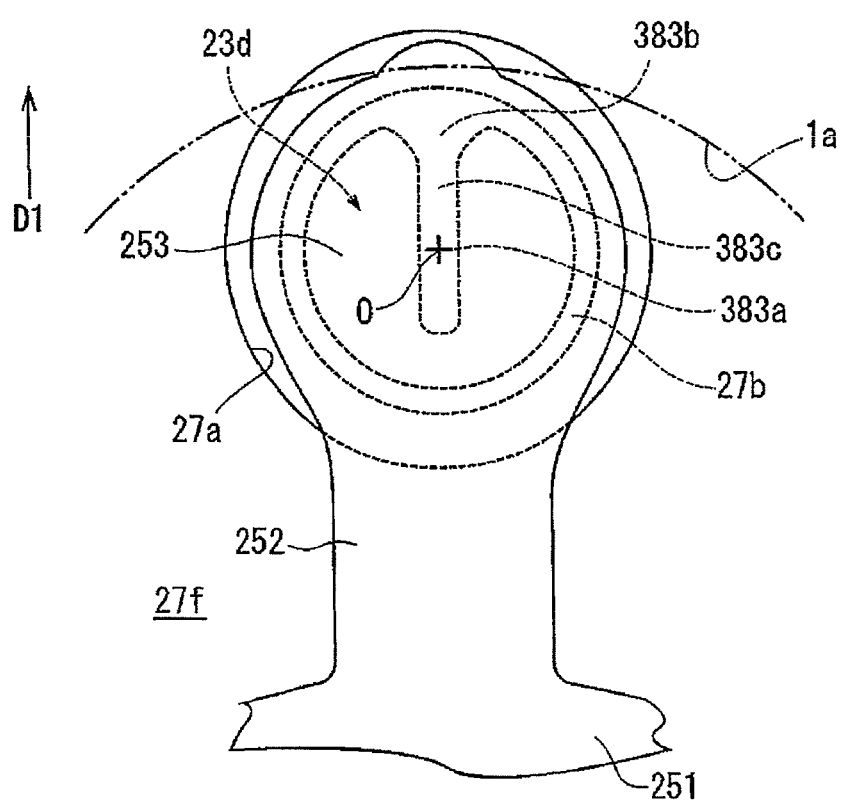
FIG. 18 is a plan view illustrating a suction reed valve of a compressor according to a thirteenth embodiment.

In a compressor according to a thirteenth embodiment, the valve base plate 27 only has a support portion 383a, a main coupling portion 383c, and a receiving portion 383b, and a U-shaped suction port 23d is employed as shown in FIG. 18. Therefore, the support portion 383a receives the central area of the valve flap 253 like the support portion 371a. The other configuration is the same as that of the first embodiment.

In this case, the same advantages as the first embodiment are obtained.

Fourteenth Embodiment

Figure 19:
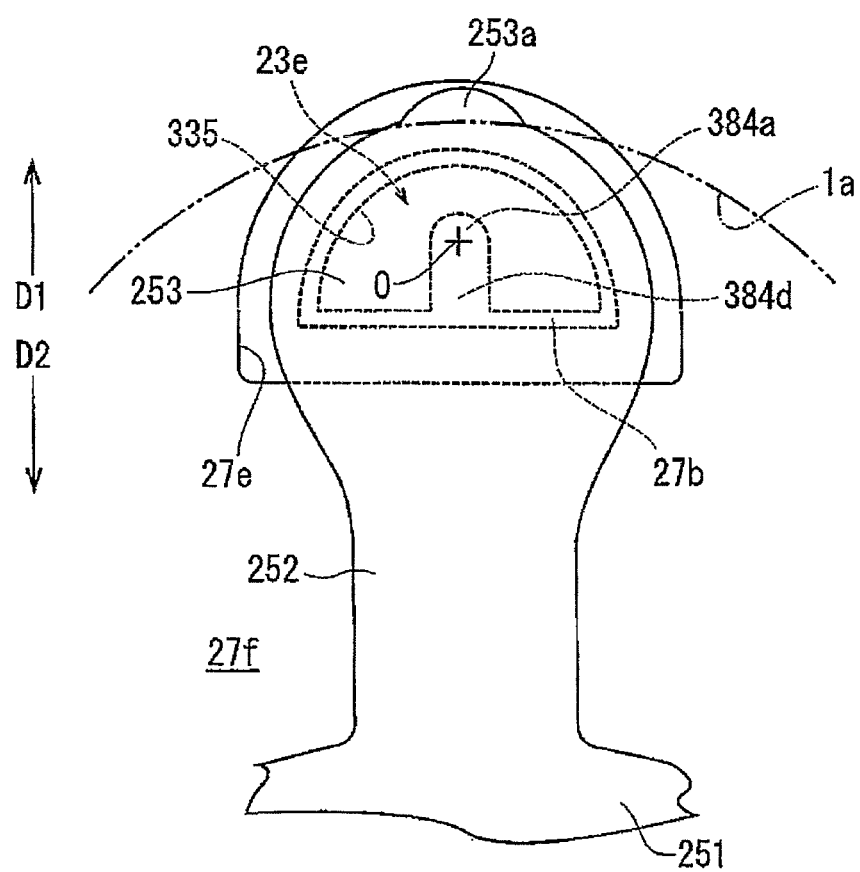
FIG. 19 is a plan view illustrating a suction reed valve of a compressor according to a fourteenth embodiment.

A compressor according to a fourteenth embodiment has a support portion 384a and an auxiliary coupling portion 384d as shown in FIG. 19. Therefore, neither receiving portion nor main coupling portion is formed at the distal end D1 of the suction port 23e. A groove 27e is employed. The groove 27e has an arcuate shape at a part closer to the distal end D1 and a shape that extends along a straight line perpendicular to the longitudinal direction at a part close to the distal end D2. The other configuration is the same as that of the first embodiment.

In this case, since refrigerant is drawn into the compression chamber 24 from the suction port 23e without being blocked by a receiving portion or a main coupling portion, the volumetric efficiency is improved. The other advantages are the same as those of the first embodiment.

Fifteenth Embodiment

Figure 20:
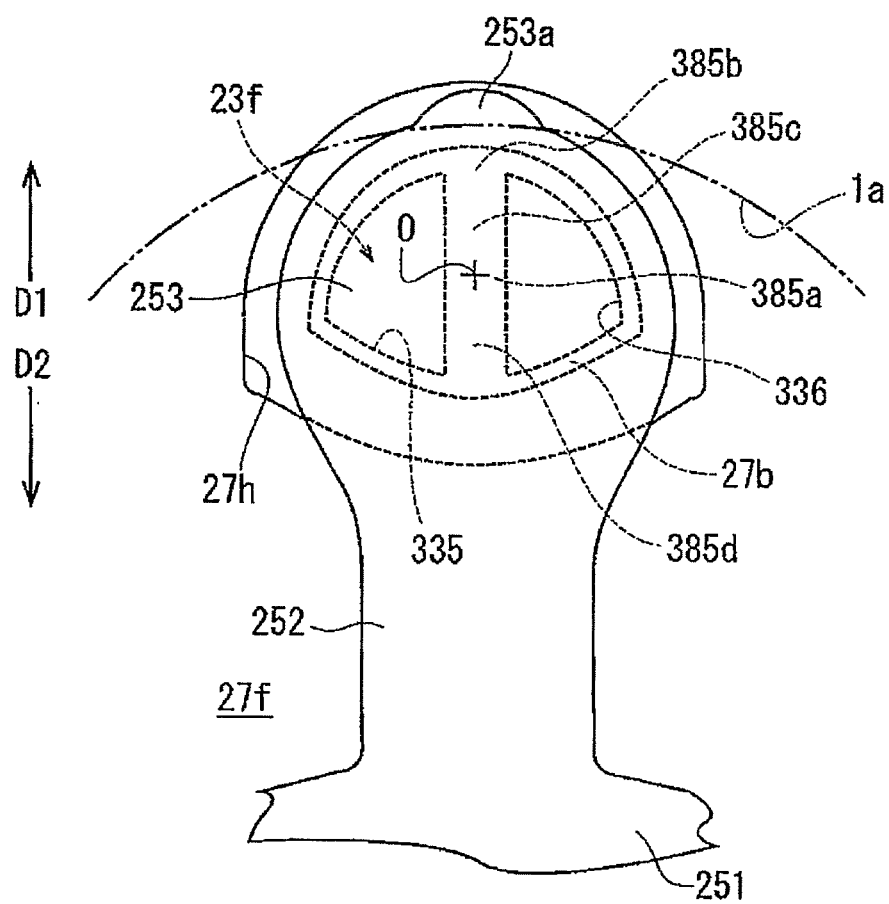
FIG. 20 is a plan view illustrating a suction reed valve of a compressor according to a fifteenth embodiment.

A compressor according to a fifteenth embodiment has a support portion 385a, a receiving portion 385b, a main coupling portion 385c, and an auxiliary coupling portion 384d as shown in FIG. 20. The width of the receiving portion 385b is equal to the width of the support portion 385a, the width of the main coupling portion 385c, and the width of the auxiliary coupling portion 385d. A suction port 23f is divided into two port sections 335, 336 by the support portion 385a, the receiving portion 385b, the main coupling portion 385c, and the auxiliary coupling portion 385d. A groove 27h is employed. A part of the groove 27h that is close to the proximal end D2 has a larger radius of curvature than that of a part of the groove 27h that is close to the distal end D1. The other configuration is the same as that of the first embodiment.

In this case, except for the advantage that is obtainable by a wide receiving portion, the same advantages as the first embodiment can be achieved.

So far, the present invention has been described with reference to the first to fifteenth embodiments. However, the present invention is not to be limited to these embodiments, but can be modified within the scope of the invention.

For example, support portions do not need to be formed in the valve base plate 27, but may be formed in another member such as a damping steel plate. A recess or a crowning may be formed only in a support portion or may be continuously formed over a support portion, a main coupling portion, and an auxiliary coupling portion.

INDUSTRIAL APPLICABILITY

The present invention may be used in a vehicle air conditioning apparatus.

Therefore, the present examples and embodiments are to be considered as illustrative and not restrictive and the invention is not to be limited to the details given herein, but may be modified within the scope and equivalence of the appended claims.

What is claimed is:

1. A compressor comprising:
a valve base plate located between a suction chamber and a compression chamber, wherein a circular suction port that connects the suction chamber and the compression chamber with each other is formed in the valve base plate;
a suction reed valve, which is elastically deformable and selectively opens and closes the suction port, wherein the suction reed valve is formed by:
a fixed portion that is fixed to a fixing surface, the fixing surface being a surface of the valve base plate that faces the compression chamber;
a base portion, which extends in a longitudinal direction of the suction reed valve from the fixed portion, wherein the base portion can be flexed; and
a valve flap, which extends from the base portion toward a distal end in the longitudinal direction, wherein the valve flap selectively opens and closes the suction port, the width of the base portion is shorter than the width of the valve flap,
the valve base plate has a support portion that supports a central area of the valve flap at the center of the suction port, and
the suction port is formed through the valve base plate,
wherein the valve base plate has a receiving portion that receives a distal area of the valve flap, and
a dimension of the receiving portion in a width direction, which is perpendicular to the longitudinal direction, is greater than that of the support portion,
a recessed groove is formed in the fixing surface, the recessed groove being located outside the suction port, and
a sealing surface between the recessed groove and the suction port,
wherein the recessed groove has a C-shape to circumferentially surround the suction port, except for a part close to the distal end in the longitudinal direction.

2. The compressor according to claim 1, wherein
the suction port has a distal suction area, which is closer to the distal end than the support portion,
the valve base plate includes a main coupling portion, which extends from the support portion to divide the distal suction area into two sections and connects the support portion and the receiving portion with each other.

3. The compressor according to claim 2, wherein
the suction port has a proximal suction area, which is closer to the proximal end in the longitudinal direction than the support portion,
the valve base plate includes an auxiliary coupling portion, which extends from the support portion to divide the proximal suction area into at least two sections, and
the suction port is formed through the valve base plate while leaving the support portion, the receiving portion, the main coupling portion, and the auxiliary coupling portion.

4. The compressor according to claim 3, wherein
the auxiliary coupling portion extends in the longitudinal direction, and
the suction port is divided into two port sections by the auxiliary coupling portion, the support portion, the main coupling portion, and the receiving portion.

5. The compressor according to claim 4, wherein the auxiliary coupling portion, the support portion, the main coupling portion, and the receiving portion are flush with the fixing surface.

6. The compressor according to claim 1, wherein
the recessed groove is formed to separate at least both side edges of the valve flap from a bottom of the recessed groove.

7. The compressor according to claim 1, wherein the width of the base portion is shorter than the length of the suction port in the width direction.

* * * * *